Jan. 19, 1960 A. FEIBUSH 2,921,440
SAFETY DEVICES FOR CONTAINED FLUID PRESSURE SYSTEMS
Filed Oct. 3, 1957 2 Sheets-Sheet 1
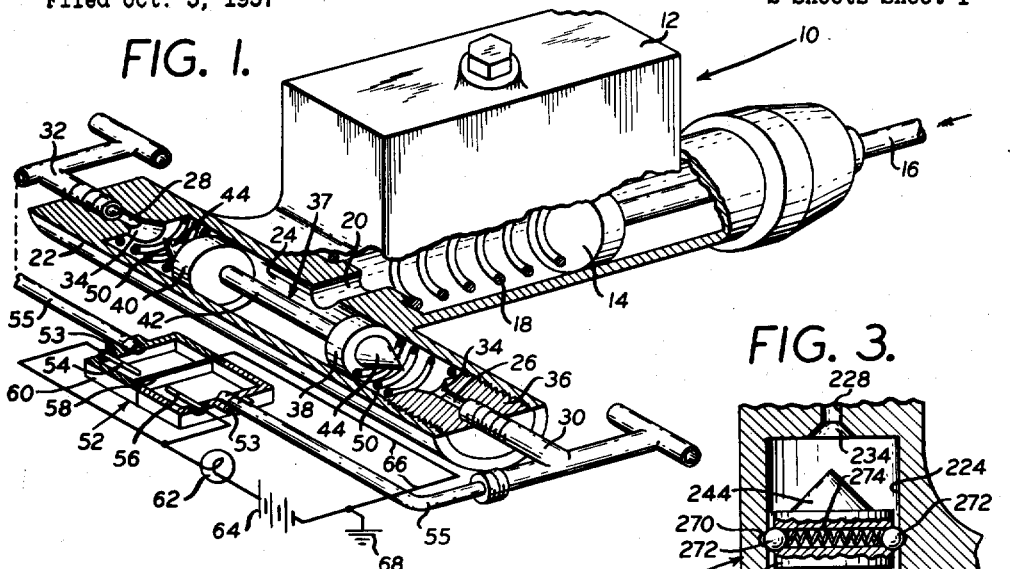
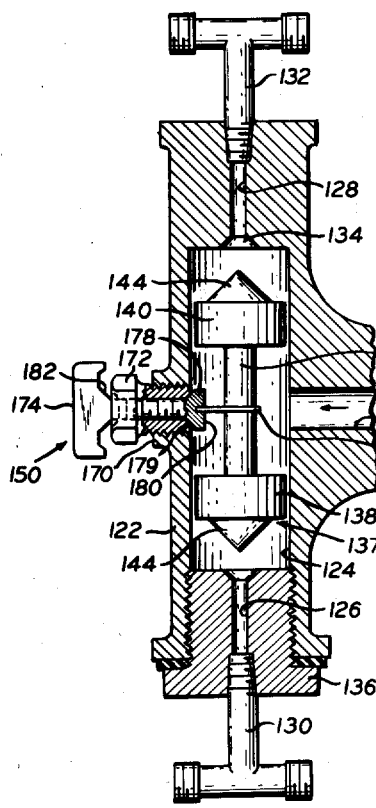
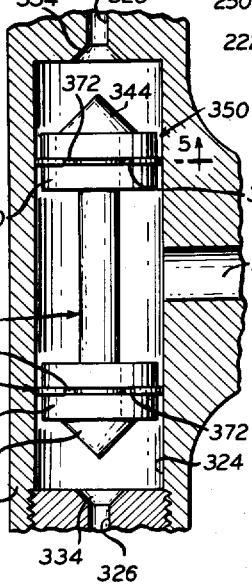
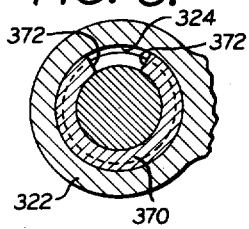
INVENTOR
ALEXANDER FEIBUSH
BY
Jerome Bauer
ATTORNEY.

Jan. 19, 1960 A. FEIBUSH 2,921,440
SAFETY DEVICES FOR CONTAINED FLUID PRESSURE SYSTEMS
Filed Oct. 3, 1957 2 Sheets-Sheet 2
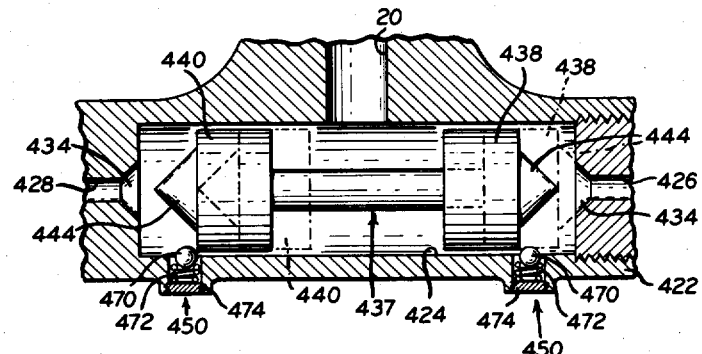
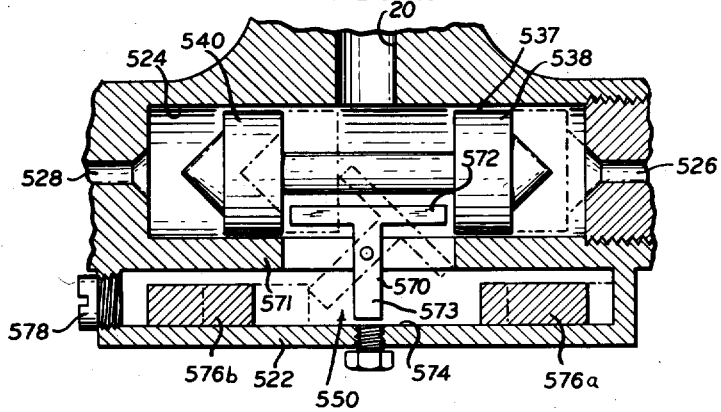
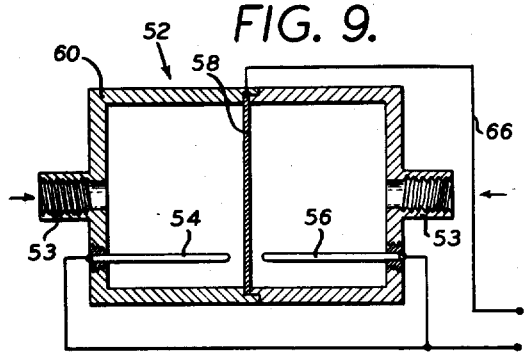
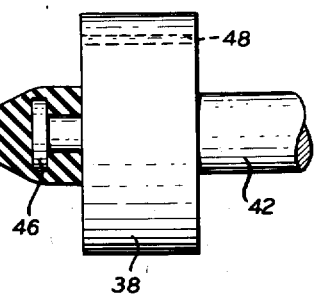
INVENTOR
ALEXANDER FEIBUSH
BY
Jerome Bauer
ATTORNEY.

United States Patent Office 2,921,440
Patented Jan. 19, 1960

2,921,440

SAFETY DEVICES FOR CONTAINED FLUID PRESSURE SYSTEMS

Alexander Feibush, New York, N.Y., assignor to Alex Manufacturing Corporation, Brooklyn, N.Y., a corporation of New York Application October 3, 1957, Serial No. 688,068

9 Claims. (Cl. 60—54.5)

This invention relates to safety devices, in structures or systems, where a displacement of a liquid or fluid under pressure is applied to perform a mechanical function such as the operation of the brakes on a motor vehicle as disclosed in the copending United States application, Serial No. 611,838, filed September 25, 1956.

In fluid pressure operated structures or systems, it is important that the entire system be leak-proof. When leakage or a breakdown occurs, the fluid placed under pressure within the system is forced through the leak or break and lost. The loss of fluid thus results in the inability of the system to deliver the necessary fluid pressure in order to perform the desired function. In motor vehicles where fluid is delivered under pressure to the individual wheel brakes, leakage anywhere in the system will result in the loss of braking fluid and braking power and an inability to stop the movement of the vehicle.

Accordingly, it is an object of this invention to provide a device that will prevent the loss of fluid from a contained fluid pressure system without, however, interfering with the operation of the system when the same is functioning normally.

In carrying out the objects, a resulting feature of the invention is the ability to form the same as an integral portion of the master cylinder in a hydraulic brake system, or to quickly and easily install the same as an adjunct to an existing fluid system.

Another object of the invention is to provide a device that is unaffected by all forces that will act thereon other than the unbalancing of the forces of the fluid under pressure in the system itself; this unbalancing resulting from a fluid leak or breakdown of the system.

Still another object of the invention is to provide a device for a fluid system that will close off the supply of fluid to the defective portion of the system while permitting the remaining portion or portions of the system to function normally.

Still another object is to provide a device for a fluid pressure system which is capable of indicating a failure in the normal operation of the same so that it may be repaired at the earliest possible time.

A further object of the invention is to provide a safety device of the aforementioned kind that requires few moving parts, that is simple and economical to manufacture and easy to install and operate.

Other and further objects of my invention reside in the structures and arrangements hereinafter more fully described with reference to the accompanying drawings in which:

Fig. 1 is a perspective view of a portion of a conventional master cylinder having a device constructed in accordance with the teaching of the invention and molded as an integral part thereof.

Fig. 2 is a plan view in cross-section of the details of an embodiment constructed in accordance with the teaching of the invention.

Fig. 3 is a plan view in cross-section showing the details of another embodiment that is constructed in accordance with the teaching of the invention.

Fig. 4 is a cross-sectional plan view wherein the details of still another embodiment are shown, constructed in accordance with the teaching of the invention.

Fig. 5 is a view of Fig. 4 taken along lines 5—5.

Fig. 6 is a cross-sectional plan view showing the details of a further embodiment that is constructed in accordance with the teaching of the invention.

Fig. 7 is a plan view in cross-section showing the details of an embodiment constructed in accordance with the teaching of the invention.

Fig. 8 is a partial front view of a portion of the valve member shown in cross-section.

Fig. 9 is a cross-section of the differential switch.

Referring now to Fig. 1 of the drawing, the numeral 10 generally identifies a conventional master cylinder of a hydraulic brake system. Master cylinder 10 includes a fluid reservoir 12 and a pressurizing piston 14 operated by a rod 16. The piston is normally retracted by a spring 18 and upon the application of pressure to the rod 16, places the fluid in the master cylinder under pressure and forces it through a forward opening 20. The opening 20 serves as an inlet port for a housing 22 having a longitudinally extending chamber 24 in which the fluid under pressure is received.

Housing 22 may be molded as an integral part of a conventional master cylinder 10 at the forward end thereof or it may be manufactured as a separate housing structure adapted to be threadably secured to the forward end of the master cylinder at the opening 20. It is to be recognized by those skilled in the art that whether the housing 22 is formed integral with the master cylinder 10 as shown in Fig. 1, or as a separate structure to be connected therewith as an adjunct to a fluid system in the manner described above, does not affect the concept or scope of the invention.

Housing 22 is provided with at least one or more outlets or ports 26 and 28. In the instant invention, the application of the safety device is described in connection with a fluid braking system for motor vehicles, hence the outlet 26 may be connected to the front wheel brakes while the port 28 may be connected to the rear wheel brakes, or vice versa. This connection is facilitated by the conduits or T-fittings 30 and 32.

In Fig. 1 of the drawing, outlets 26 and 28 are provided with frusto-conically shaped seats 34. In order to form the outlets 26 and 28 and their respective seats 34, one end of the housing 22 may be bored and threaded to receive a threaded plug 36 while the other end of the housing is drilled to provide the outlet 28 and then countersunk to form its frusto-conical seat 34. The outlet 26 and its respective countersunk seat 34 may be provided before the closing plug 36 is threaded into the housing 22. Hence the housing may be provided with at least one or more outlets 26 and 28 through which the fluid received therein under pressure by way of the inlet 20, is conveyed to the brakes to perform their normal braking operation.

Positioned within the chamber 24 of the housing 22, is a valve member generally identified by the numeral 37. Member 37 has a pair of heads 38 and 40 linked or interconnected by a body 42 for conjoint movement. The heads 38 and 40 provide surfaces against which the fluid under pressure received in the chamber 24, imparts a moving force. Inasmuch as the valve member is in the path of movement of the fluid passing from the inlet 20 and out of the chamber 24 by way of the outlets 26 and 28, the fluid must by-pass the valve member.

In operation this by-pass may be facilitated by forming the heads 38 and 40 of a slightly smaller diameter or size than the chamber 24 within which the valve member is located. Hence the fluid under pressure received in the chamber 24 by way of the inlet will by-pass the smaller heads 38 and 40 of the valve member and continue its movement under pressure through the outlets 26 and 28 to the brakes of the motor vehicle. The valve member 37 is provided at each of its heads with valve seats 44 (see Fig. 8) that are adapted to coincide with and seat congruously with the frusto-conical seats 34 of the outlet ports.

Referring to Fig. 8 wherein one of the valve member valve seats 44 is shown, the valve head 40 is provided with an extension 46 that is T-shaped in cross-section. The seat 44 is molded of a pliable material such as rubber or a soft plastic that includes a T-shaped groove formation which fully engages about the extension 46 of the valve member and locks thereto. The pliable seats 44 thus are capable of providing firm leak-proof engagement with the outlet ports 26 and 28 when seated within the frusto-conical seats 34 thereof.

In practice, however, it has been found that when the valve member 37 is composed of a relatively hard material or metal, the conical valve seats 44, formed on the heads thereof, need not be separable and pliable, but may be an integral part of the valve member and formed of the same material and the seats 34 may be eliminated.

It will be remembered that the front wheel brakes of a braking system for motor vehicles require a greater volume of fluid than the rear wheel brakes. Hence it will be necessary to provide that the valve head leading to the front wheel brakes permit the passage of this greater volume of fluid under pressure through its respective outlet. This may be accomplished in many ways. It has been found that a hole 48 drilled longitudinally through the head, will permit the passage of a slightly greater volume of fluid to the front wheel brakes. This is shown more clearly in Fig. 8 of the drawings.

Normally when the fluid in the master cylinder 10 is placed under pressure by the forward movement of the piston 14 therein, the fluid is transmitted to and received in the chamber 24 of the housing 22. The fluid accordingly exerts force on all of the surfaces of the valve member 37 while flowing about the heads of the valve and through the outlets 26 and 28. Since the force of the fluid pressure applied to the surfaces of the valve member is substantially uniform thereabout, it is automatically positioned in a normal relationship within housing 22 wherein each of its valve seats 44 are spaced from the seats 34 of the outlets 26 and 28 when the fluid pressure in the corresponding outlet lines is normal. This normal positioning of the valve member permits unobstructed the flow of the fluid to the outlets.

However, in the event a leak or failure should develop in the system, there is a drop or an unbalancing of fluid pressure in the line in which the leak or failure occurs. Inasmuch as the valve 37 retains its normal spaced relationship from the outlet ports only when the outlets retain their normal pressure, and the forces exerted on its surfaces are substantially uniform, any drop in the normal pressure in the outlets will automatically impart an unbalanced force to the valve member and cause the same to be moved by the fluid under pressure toward the outlet evidencing a drop in fluid pressure. This movement of the valve member 37 positions its valve head 44 into coinciding seating relationship with the seat 34 of the affected outlet port and closes off further passage and loss of fluid through such outlet port. This closing movement of the valve 37 does not, however, affect the other outlet and allows it to function normally.

When the present invention is employed in motor vehicles, the valve member 37 is sometimes affected by centrifugal forces when the vehicle executes a rapid maneuver. In some instances the centrifugal forces may be sufficiently strong to move the valve to close one of the outlet ports. To prevent this, restraining means in the form of coiled springs 50 are located in position between the heads 38 and 40 of the valve member and their respective outlet ports 26 and 28. The springs 50 serve to apply a restraint of predetermined force to the opposite ends of the valve member.

This restraint is only of sufficient magnitude to balance out all extraneous or undesired forces, as centrifugal forces, that may tend to affect the valve member without, however, obstructing the movement of the valve member 37 when fluid under pressure is applied thereagainst upon a drop in fluid pressure in the outlets. Hence the forces applied to the valve member 37 by the restraining means 50, are intended only to overcome undesired forces applied thereto, but not the forces of the fluid under pressure upon the occurrence of a drop in pressure in one of the outlet lines.

In some instances, it has been found convenient to provide a mechanism to indicate or signal the failure of or a drop in pressure in the fluid system. To do this, a differential switch 52, shown in greater detail in Fig. 9, is interconnected at its ends 53 to the outlet fittings 30 and 32 by fluid lines 55, and includes a pair of switch contact members 54 and 56. The switch contact members have a common contact element 58 that operates in the manner of a diaphragm and is affected by changes in pressure within the differential switch housing 60.

Any change or drop from the normal pressure in the outlet lines 30 and 32 will be transmitted to the differential switch housing 60 through lines 55, causing the diaphragm 58 fixed therein to move toward the low pressure side and into engagement with the respective switch contact therein. Each switch contact 54 and 56 is connected to a signal device, as a lamp 62, that may be conveniently mounted on the dashboard of the motor vehicle. The signal device 62 is, in turn, connected to a battery 64 or other source of electrical energy, while the electrical circuit to the diaphragm contact 58 of differential switch 52 is closed from the battery by a line or conductor 66. Line 66 may be grounded at 68 to any suitable portion of the vehicle.

The embodiments shown in the remaining figures of the drawings are basically the same in structure and operation as that shown in Fig. 1 and described above. For these reasons, each of the embodiments to be described hereinafter will bear the same suffix numeral as its corresponding part shown in Fig. 1.

Although the housing 122 shown in the embodiment in Fig. 2 may be made as a unit separate from the master cylinder 10, it is shown molded as an integral part of the master cylinder and receives fluid under pressure therefrom by way of the port 20. Movably contained within the chamber 124 is a valve member generally identified by the numeral 137.

Valve member 137 comprises a pair of spaced valve heads 138 and 140 interconnected or linked together by a body 142. Each valve head is provided with a valve seat 144, either of the construction shown and described in Fig. 8, or of the same material as the valve member 137, as previously described.

The seats 144 are adapted to fit into and close the outlet port 126 provided in the plug 136 or the outlet port 128 provided in the opposite end of the housing 122. In the event the valve seats 144 are constructed in the manner shown in Fig. 8, each outlet port 126 and 128 will be provided with a countersunk complementary seat 134 in the manner as described in connection with Fig. 1 above.

In the embodiment in Fig. 2, the valve member 137 is normally positioned substantially centrally in the chamber 124 in spaced relationship from the outlets 126 and 128 by the fluid moving under pressure into the chamber 124 by way of the port 20. This normal position of the valve member permits the fluid to pass about its surfaces and out from the chamber by way of the outlet ports. The forces exerted on the surfaces of the valve member 137 by the moving fluid under pressure, positions the valve member in its normal spaced relationship from the outlet ports for as long as the pressure in the outlet lines is normal also.

Upon a drop in pressure in any one of the outlet lines 126 or 128 by reason of a failure or leakage occurring therein, there is a resultant unbalancing of forces acting on the surfaces of the valve member whereby the superior force of the fluid moving under pressure toward that outlet in which the failure and also the drop in fluid pressure occurs, causes the valve member to move into valve seating and closing engagement with the defective outlet. In the meanwhile, the other outlet line leading from the housing 122 remains open for normal operation to receive the fluid under pressure moving into the chamber 124 by way of the port 20 and conduct the same to operative brake mechanisms.

In Fig. 2, the outlet lines 130 and 132, connected to their respective outlets 126 and 128 at opposite sides of the housing 122, may be linked by lines 55 to an indicating mechanism 62, in a manner similar to the outlet lines 30 and 32 shown and described in Fig. 1. If the signalling device 62 and its attendant differential switch 52 are found to be unnecessary, lines 55 are eliminated and, instead, the opposite sides of the T-shaped fitting 130 may be connected directly, one to the left and one to the right wheel of the front wheel brakes and the opposite sides of fitting 132 connected, one to the left and one to the right wheel of the rear wheel brakes.

Because it is possible that the valve member 137 may be moved accidently as a result of undesired centrifugal forces acting thereon during a severe turning of the vehicle on which the same is mounted, there is provided a restraining structure 150 to resist the movement of the valve member in response to such undesired forces. In this embodiment, the restraining means 150 is mounted within a boss 170 that extends transversely from the housing 122 in a direction normal to the axial movement of the valve member 137. Threadably mounted for securement within the boss 170, is a mounting plug 172 that is provided with an internal thread adapted to receive a threaded member or disabling screw 174.

The disabling screw member 174 may be conveniently provided with a wing nut-shaped head and a threaded body that is axially adjustable within the plug 172. Secured within the screw 174 is a round restraining spring 176 that bears against the body 142 of the valve member 137 and exerts thereon a substantially constant frictional unvarying restraining force in a direction normal to the direction of movement of the valve member. Spring 176 is round to enable it to be rotated on the body 142 with its screw 174. It is securely mounted in the lower valve head portion 178 of the screw member by brazing, although any other convenient method may be acceptable. The lower valve head 178 is provided with a flat surface 180 that is adapted to seat against the body 142 in the manner and for a purpose to be described.

During the normal operation of the embodiment shown in Fig. 2, all undesired forces acting on the valve member 137 are neutralized by the transverse force exerted thereon by the spring 176. As in the prior disclosure with respect to Fig. 1, the force of the spring 176 is only sufficient to cancel undesired forces imparted to the valve member. The restraining force is not sufficient to overcome the force of the fluid under pressure that serves to move the valve member into engagement with either of the outlets 126 or 128 when there is a drop in the normal pressure in such outlets.

Hence, during the normal operation of this embodiment, the screw 174 is withdrawn to its position shown in Fig. 2, and to prevent loss of fluid from the chamber 124 by way of the threaded engagement of the screw 174 with its plug 172, the screw and plug are provided with mating tapered valve seats 179 in the area of the lower valve head 178. These mating seats form a secure closure against the loss of fluid between the threaded surfaces of the screw 174 and the plug 172.

When a break or leakage occurs in the closed fluid system in which the instant invention is accommodated, it is necessary after repairing the damage, to bleed the system of air, thereby insuring the proper operation of the same. During such bleeding operation, the outlet lines are opened and, in consequence, actually obviate the build-up of normal fluid pressure therein. As the line is bled, the fluid under pressure passing into the chamber 124 and out through the bleeding outlet, will move the valve member to close such outlet and therefore defeat the bleeding operation.

To enable the bleeding operation and at the same time prevent the closing movement of the valve member 137, the disabling screw 174 is threaded from its normally retracted position, as shown in Fig. 2, to a position wherein its flat surface 180 engages against the body 142 of the valve member. This engagement securely holds it from movement in response to the "bleeding" fluid moving through the open line.

Here again, however, we are faced with the problem of preventing the loss of fluid from about the cooperating threaded surfaces of the screw 174 with the plug 172. This loss is prevented by again providing the screw 174 with a further upper valve seat 182 that moves into cooperating closing seating engagement with a mating seating surface provided in the plug 172. The seating engagement of the screw 174 with the plug 172 at the surface 182 serves as an adequate closure against the possibility of loss of fluid about the threaded cooperating surfaces of these members.

In the embodiment shown in Fig. 3, the valve member 237 is also restrained from movement from its normal position wherein it is in spaced relationship relative to the outlets 226 and 228 in response to undesired forces acting thereon by a restraining means 250 provided in at least one of the heads 238 or 240. For illustrative purposes, the embodiment shown in Fig. 3 shows such restraining means 250 provided in each of the heads 238 and 240 of the valve member 237.

The restraining means 250 includes a peripheral groove 270 formed in the wall of the chamber 224. The grooves 270 are arcuate in cross-section and are formed of a predetermined radius of curvature. Cooperating with the groove 270 is at least one releasable ball 272 that is biased by a spring 274 into releasable engagement therewith. The radius of curvature of the groove 270 is slightly less than that of the ball 272 while the force of the biasing spring 274 is of predetermined value such as to exert a force of engagement at the point of contact between the ball 272 with the cooperating groove 270 sufficient to overcome and neutralize all undesired forces acting on the valve member 237 to move the same into closure with the outlets 226 or 228.

During the normal operation of this embodiment wherein the fluid pressure in the outlet lines is maintained, the force exerted on the surfaces of valve member 237 by the fluid moving under pressure through chamber 224, is substantially equal and therefore positions the valve member in its normal spaced relationship from the outlets. However, when a drop in the normal pressure is evidenced in any one of the outlet lines, there is an unbalancing of forces acting on the surfaces of the valve member and, as in the prior embodiment, the valve is caused to move into closing engagement with the low pressure line. The unequal fluid pressures, acting on the surfaces of the valve member 237, are sufficient to overcome the engaging cooperation of the ball 272 and the groove 270 to cause the valve to move into its closing engagement with the affected fluid outlet.

In the embodiment shown in Fig. 4, the restraining means 350 may be provided in one or more of the valve heads 338 or 340 despite the showing in Fig. 4 wherein, for illustrative purposes only, a restraining structure is shown provided in each valve head. The restraining means 350 includes an open-ended ring-shaped member 370 whose ends 372 (Fig. 5) are predeterminately spaced from each other to permit the by-pass of fluid under pressure from the chamber 324 therethrough to the outlets 326 and 328.

The ring 370 is seated within a mating groove in the valve head of the valve member 337 while its outer peripheral surface frictionally bears against the wall of the chamber 324 to exert the constant restraining force against the movement of the valve member. Here again, the tension that the member 370 exerts against the wall of the chamber 324, may be predetermined such that it will exert a force on the valve member only sufficient in magnitude to overcome undesired forces acting thereon, but not sufficient to overcome the normal moving force of the fluid under pressure when there is a drop in the normal pressure in one of the outlets.

In the embodiment shown in Fig. 6, the restraining means 450 include roller elements 470 that are biased by springs 472 into the path of movement of the valve member 437. Each restraining means 450 is so located with respect to the heads 438 and 440 as to provide an immediate abutting engagement therewith, thereby limiting and applying thereto a substantially constant unvarying force restraining the axial movement of the valve member 437 in response to undesirable forces acting thereon.

In this embodiment, the tension or force exerted by the springs 472, may be varied by the adjustment of caps 474. However, the restraining forces exerted by the restraining means 450 against the axial movement of the valve member 437 are only sufficient to overcome and nullify undesirable moving forces acting on the valve member but not great enough to overcome the movement of the valve in response to a drop in the normal pressure that may occur at any one of the outlet lines 426 or 428.

In the event there is a drop in pressure in the outlet line 426, the valve member 437 will be moved into its dot-dash closing engagement with the valve seat 434 of the outlet 426. Its movement results from the unequal forces acting thereon as the fluid entering into the chamber 424 under pressure by way of the inlet 20, attempts to follow the line of lowest pressure. In its closed position the valve head 438 depresses and rides over the restraining ball 470 rendering it inactive.

In the embodiment in Fig. 7, the undesired forces acting upon the valve member 537, are utilized to counteract the very movement that they intend to impart to the valve member. This is accomplished by providing a restraining structure 550 that includes a T-shaped member 570 pivoted in a wall 571 of the housing 522. The head 572 of the T-shaped member is located between and is adapted to engage with the heads 538 and 540 of the valve member 537 upon the occurrence of any undesired movement of the same to overcome and resist such movement. Provided within the housing 522 is a bore 574 in which weight members 576a and 576b are freely movable and enclosed by a closure 578. Each weight member is of substantially the same total weight as the valve member 537 and is therefore acted upon by the same forces as affect the valve member.

In operation, when the fluid pressure in the outlet lines 526 and 528 is normal, the valve 537 is caused to assume its normal position in spaced relationship from such outlet lines by the force of the fluid under pressure acting equally on all of its surfaces. When in this condition undesirable forces, as centrifugal forces, shall be imparted to the valve member 537, it would normally tend to move in response thereto and perhaps close one of the outlets 526 or 528, depending upon the applied direction of such forces. To counteract the movement of the valve member, the weight members 576a and b are also subjected to the same undesired force and move also in response thereto into engagement with the arm 573 of the pivot member 570 that extends into the bore 572. This arm is thus moved by one of the weight members 576a and b and causes the member 570 to pivot into the forward surface of the rearward valve head of the moving valve member 537. Hence, if valve member 537 would be moved to its dot-dash position by the application of centrifugal forces acting thereon, so also would both weights 576a and 576b. During such movement the weight member 576b will abut the arm 573 and pivot its head into engagement with the forward surface of the valve head 540 with a force equal to that applied to the valve member 537 but opposite to its applied direction. In this embodiment the undesired forces acting upon the valve member are also utilized to overcome and restrain its movement in response thereto.

It will be recognized of course that in the event there is a drop in the normal fluid pressure in any one of the outlet lines, the force exerted by the fluid under pressure entering the chamber 524, by way of the inlet 20, will cause the valve member 537 to move toward the side of the low pressure drop and into engagement with the respective outlet port. This closing movement of the valve member 537 is not in any way restricted by the restraining means 550 since the pivot member 570 will be pivoted into an inactive dot-dash-line position shown in Fig. 7, and the forces that may be exerted accidentally by the weight members 576 will be so inconsequential as not to affect the proper operation thereof.

Those who are skilled in the art will readily understand that it is possible to substitute for the two weight members 576a and 576b provided in the bore 574, a single weight member in which the arm of the pivot member 570 may be positioned. When a single weight member is utilized, it will be at least equal in weight to that of the valve member 537.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

I claim:

1. In a safety device for a braking system including a plurality of separate fluid-operated brake members, a housing to receive braking fluid under pressure and having outlets to direct said braking fluid under pressure to said separate brake members, movable means positioned in said housing, said movable means having surfaces acted upon by the brake fluid normally to position the same away from said outlets when the fluid pressure at said outlets is substantially normal and movable into engagement with said outlets by said braking fluid under pressure to close the same when the fluid pressure thereat is below normal, and means co-acting between said movable means and said housing, said coacting means applying a constant frictional resistance to the movement of said movable means relative to said outlets in response to centrifugal forces acting on said movable means.

2. In a safety device for a braking system including a plurality of separate fluid operated brake members, a housing member to receive braking fluid under pressure and having outlets to direct said pressurized braking fluid to said separate brake members, a member movable in said housing member in the path of said pressurized braking fluid and including surfaces against which said fluid applies a force normally to retain said movable member spaced from said outlets when the fluid pressure at said outlets is substantially normal, transversely disposed means between said members applying a constant force therebetween to restrain the movement of said movable member in response to centrifugal forces acting thereon but permitting movement of said member by the braking fluid to close the passage of fluid through said outlets when the pressure thereat drops below normal, and the fluid acting upon said surfaces to space said movable member from said outlets when the pressure thereat returns to substantially normal.

3. In a fluid braking system including a plurality of separate fluid-operated brakes, a master cylinder having a fluid reservoir, a piston movable to expel fluid under pressure from the master cylinder, a housing formed integral with said master cylinder, a passage forming a communication from said master cylinder with said housing and through which the fluid under pressure is expelled into said housing, fluid outlets in said housing through which the fluid under pressure is moved to operate said brakes simultaneously, and a movable member in said housing movable by said fluid expelled by said piston to a position normally spaced with respect to said outlets when the fluid pressure at said outlets is normal and movable by said fluid pressure to close said outlets when the fluid pressure thereat is below normal, and transversely disposed yieldable means exerting a constant force on said member to resist and overcome centrifugal forces acting thereon to retain the same in its normal position and to permit its movement in response to said fluid pressure.

4. In a fluid pressure braking system having at least a fluid-operated brake, a housing having an inlet through which fluid under pressure is introduced thereinto and including at least an outlet through which the fluid under pressure is directed therefrom to said brake to operate the same, a valve member in said housing, said valve member having surfaces against which said fluid exerts forces normally to position said valve member away from said outlet when the pressure in said outlet is normal and to move said valve member to close said outlet when the pressure therein is below normal, and resilient means extending transversely between the housing and valve member applying a restraint of constant force on said valve member to overcome all forces acting thereon to move the same other than that of said fluid pressure acting thereon to move said valve member to close said outlet.

5. In a fluid pressure braking system for a vehicle having front and rear wheel brakes, a housing having a chamber in which fluid under pressure is received, outlets in said housing to exhaust said fluid under pressure to said brakes, a valve member movable in said chamber between said outlets and in the path of said fluid under pressure, said valve member having a plurality of heads, one for each of said outlets and a smooth and uninterrupted body interconnecting said heads for conjoint movement, said heads being of a size smaller than said chamber to enable the passage of a predetermined volume of said fluid therebetween and to said outlets, the fluid under pressure exerting forces on said heads to position said valve member in a normal spaced relationship from said outlets when the fluid pressure in said outlets is normal, means in said chamber exerting unvarying frictional restraining force against the movement of said valve member in response to undesired forces other than the fluid pressure acting thereon, and said fluid pressure overcoming said restraining means and moving said valve member to close an outlet when the pressure therein drops below normal and to return said valve to its normally spaced relationship from said outlets when the fluid pressure in said outlets is normal.

6. In a fluid pressure braking system as in claim 5, said restraining means resiliently co-acting with said smooth and uninterrupted body of said valve member to exert a constant force thereagainst to resist said undesired forces acting thereon.

7. In a fluid pressure braking system as in claim 6, said restraining means bearing transversely against said interconnecting body and exerting constant restraining force thereon normal to the direction of movement of said valve member.

8. In a fluid pressure braking system as in claim 5, the wall of said chamber being smooth and uninterrupted, a peripheral groove in at least one of said heads, said restraining means including an open-ended ring in said groove frictionally bearing against the wall of said chamber to exert a constant restraining force on the movement of said valve member.

9. In a fluid pressure braking system as in claim 8, the space between the open ends of said ring permitting the passage of fluid under pressure from said chamber to said outlets.

References Cited in the file of this patent

UNITED STATES PATENTS

| | | |
|---|---|---|
| 1,588,657 | Christensen | June 15, 1926 |
| 1,664,680 | Hallett | Apr. 3, 1928 |
| 1,936,504 | Foster et al. | Nov. 21, 1933 |
| 2,093,015 | Madden | Sept. 14, 1937 |
| 2,127,849 | Stone | Aug. 23, 1938 |
| 2,195,214 | Jacob | Mar. 26, 1940 |
| 2,203,908 | Hess | June 11, 1940 |
| 2,534,871 | Lichtman | Dec. 19, 1950 |
| 2,615,105 | Whitney | Oct. 21, 1952 |
| 2,710,620 | Watson | June 14, 1955 |
| 2,811,600 | Storck et al. | Oct. 29, 1957 |
| 2,833,117 | Wilcocks | May 6, 1958 |
| 2,854,016 | Margida | Sept. 30, 1958 |

FOREIGN PATENTS

| | | |
|---|---|---|
| 693,197 | France | Aug. 18, 1930 |
| 1,083,389 | France | June 23, 1954 |
| 361,532 | Great Britain | Nov. 26, 1937 |
| 447,028 | Italy | Apr. 1, 1949 |